(12) United States Patent
Rowe et al.

(10) Patent No.: US 11,624,376 B2
(45) Date of Patent: Apr. 11, 2023

(54) HYBRID ACTUATION DEVICES WITH ELECTROSTATIC CLUTCHES

(71) Applicant: Toyota Motor Engineering & Manufacturing North America, Inc., Plano, TX (US)

(72) Inventors: Michael P. Rowe, Pinckney, MI (US); Maduran Palaniswamy, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/540,786

(22) Filed: Dec. 2, 2021

(65) Prior Publication Data
US 2023/0078040 A1   Mar. 16, 2023

Related U.S. Application Data

(60) Provisional application No. 63/243,824, filed on Sep. 14, 2021.

(51) Int. Cl.
  *F15B 7/08*    (2006.01)
  *F03G 7/06*    (2006.01)
  *H01B 5/00*    (2006.01)

(52) U.S. Cl.
  CPC .............. *F15B 7/08* (2013.01); *F03G 7/0646* (2021.08); *F03G 7/06143* (2021.08); *H01B 5/00* (2013.01)

(58) Field of Classification Search
  CPC .... F03G 7/0646; F03G 7/06143; F03G 7/062; F15B 15/103; F15B 7/08
  See application file for complete search history.

(56) References Cited

U.S. PATENT DOCUMENTS

| | | | |
|---|---|---|---|
| 2005/0199455 A1 | 9/2005 | Browne et al. | |
| 2009/0131752 A1 | 5/2009 | Park | |
| 2012/0019216 A1* | 1/2012 | Lewis | H02J 7/345 320/166 |
| 2014/0277739 A1 | 9/2014 | Kornbluh et al. | |
| 2017/0203432 A1* | 7/2017 | Andrianesis | A61F 5/013 |

FOREIGN PATENT DOCUMENTS

| | | |
|---|---|---|
| EP | 3196484 A1 | 7/2017 |
| WO | 2011111769 A1 | 9/2011 |

* cited by examiner

*Primary Examiner* — Abiy Teka
*Assistant Examiner* — Daniel S Collins
(74) *Attorney, Agent, or Firm* — Dinsmore & Shohl LLP

(57) ABSTRACT

A hybrid actuation device including a first plate and a second plate coupled to the first plate, a shape memory alloy wire coupled to the first plate and the second plate, a bladder positioned between the first plate and the second plate, the bladder housing a fluid, a first fixed electrode coupled to the second plate, and a flexible electrode coupled to the first plate and extending along the first fixed electrode.

20 Claims, 7 Drawing Sheets

HYBRID ACTUATION DEVICES WITH ELECTROSTATIC CLUTCHES

CROSS-REFERENCE TO RELATED APPLICATION

This application claims priority to U.S. Patent Application No. 63/243,824, filed Sep. 14, 2021, for "Hybrid Actuation Device with an Electrostatic Clutch," which is hereby incorporated by reference in its entirety including the drawings.

TECHNICAL FIELD

The present specification generally relates to hybrid actuation devices that include shape memory alloy materials and an electrostatic clutch.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using fluid-based actuators. For example, fluid-based actuators may introduce fluid into and out of a volume to expand or contract the fluid-based actuators to perform mechanical work on a load. However, fluid-based actuators require a large amount of voltage to operate.

Accordingly, a need exists for improved actuation devices that reduce the amount of voltage required to operate.

SUMMARY

In one embodiment, a hybrid actuation device including a first plate and a second plate coupled to the first plate, a shape memory alloy wire coupled to the first plate and the second plate, a bladder positioned between the first plate and the second plate, the bladder housing a fluid, a first fixed electrode coupled to the second plate, and a flexible electrode coupled to the first plate and extending along the first fixed electrode.

In another embodiment, a hybrid actuation device including a first plate and a second plate pivotally coupled to the first plate, a bladder comprising a compressible portion and an offset portion, the bladder housing a fluid positioned between the first plate and the second plate, the offset portion of the bladder positioned apart from the first plate and the second plate, and a shape memory alloy wire coupled to the first plate and the second plate. The shape memory alloy wire is configured to move the first plate and the second plate between a non-actuated position and an actuated position when a current is applied to the shape memory alloy wire. When moving from the non-actuated position to the actuated position, the first plate and the second plate are pivoted toward each other to compress the compressible portion of the bladder positioned between the first plate and the second plate, and to expand the offset portion of the bladder positioned apart from the first plate and the second plate.

In yet another embodiment, a method of operating a hybrid actuation device, the method including: actuating the hybrid actuation device, the hybrid actuation device includes a first plate and a second plate coupled to the first plate, a shape memory alloy wire coupled to the first plate and the second plate, the shape memory alloy wire configured to move the first plate and the second plate from a non-actuated position to an actuated position, when in the actuated position, a distance between a distal end of the first plate and a distal end of the second plate being less than a distance between the distal end of the first plate and the distal end of the second plate when in the non-actuated position, a bladder positioned between the first plate and the second plate, the bladder housing a fluid, a first fixed electrode coupled to the second plate, and a flexible electrode coupled to the first plate and extending along the first fixed electrode; and applying a current to the flexible electrode and the first fixed electrode thereby electrostatically attracting the flexible electrode and the first fixed electrode together to hold the first plate and the second plate in the actuated position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
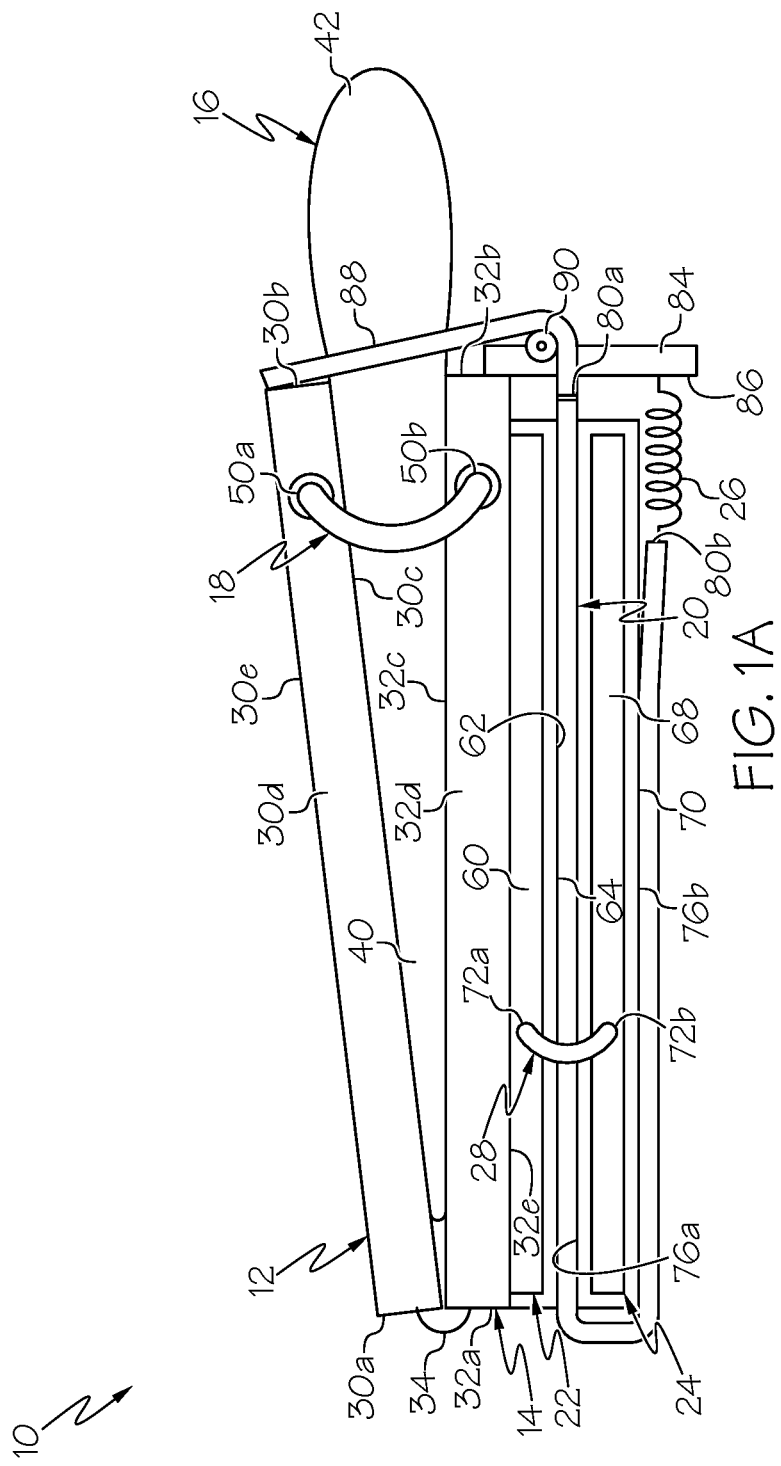
FIG. 1A schematically depicts a side view of a hybrid actuation device in a non-actuated state, according to one or more embodiments shown and described herein.

Embodiments described herein are directed to hybrid actuation devices that include a shape memory alloy (SMA) wire and an electrostatic clutch. A bladder housing a fluid, such as a dielectric fluid, is positioned between and coupled to a plate pair comprising a first plate and a second plate that are hinged or otherwise coupled together along an end of the plate pair. A portion of the bladder is positioned apart from a space between the first plate and the second plate such that an offset region of the bladder is offset from a perimeter of the first plate and the second plate of the plate pair. The SMA wire is coupled to the plate pair. The SMA wire is configured to move the first plate and the second plate between a non-actuated position and an actuated position such that application of a stimulant, such as current flow, in the SMA wire contracts the SMA wire and closes the plate pair together, placing the hybrid actuation device in an actuated state. When the SMA wire contracts, drawing the first plate and the second plate together and placing the hybrid actuation device in the actuated state, the fluid is directed into the offset region of the bladder, expanding the offset region.

The hybrid actuation device also includes a flexible electrode that extends along a first fixed electrode and a second fixed electrode. An electrode pinching spring compresses the first fixed electrode and the second fixed electrode to contact the flexible electrode. A holding thread couples the first plate to a first end of the flexible electrode and a tension spring is coupled to the second end of the flexible electrode. The tension spring contracts the flexible electrode when the SMA wire contracts and draws the plate pair together. Moreover, the flexible electrode and the fixed electrode electrostatically attract upon application of a voltage to hold the hybrid actuation device in the actuated state with the holding thread. This allows actuation (e.g., contraction) of the SMA wire to cease while retaining the hybrid actuation device in the actuated state. Various embodiments of the hybrid actuation device and the operation of which are described in more detail herein. Whenever possible, the same reference numerals will be used throughout the drawings to refer to the same or like parts.

Figure 1B:
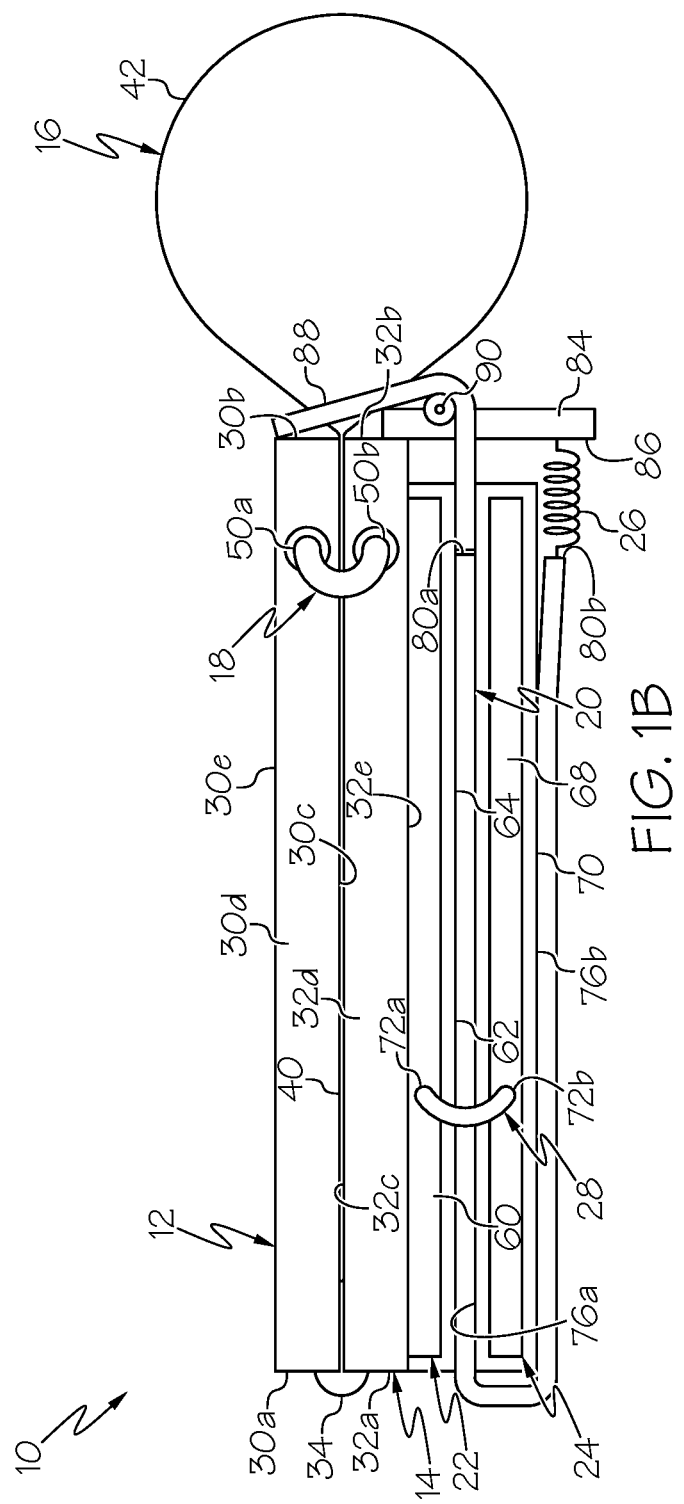
FIG. 1B schematically depicts a side view of the hybrid actuation device of FIG. 1A in an actuated state, according to one or more embodiments shown and described herein.

Referring now to FIGS. 1A and 1B, a hybrid actuation device 10 is schematically depicted in a non-actuated state (FIG. 1A) and an actuated state (FIG. 1B). The hybrid actuation device 10 may include a first plate 12, a second plate 14, a bladder 16 at least partially positioned between the first plate 12 and the second plate 14, a shape memory alloy (SMA) wire 18 integrated within and extending between the first plate 12 and the second plate 14, a flexible electrode 20, a first fixed electrode 22, a second fixed electrode 24, a tension spring 26, and an electrode pinching spring 28. The first plate 12 may include a proximal end 30a, an opposite distal end 30b, an inside surface 30c, a side edge 30d, and an outside surface 30e opposite the inside surface 30c. The second plate 14 may include a proximal end 32a, an opposite distal end 32b, an inside surface 32c, a side edge 32d, and an outer surface 32e opposite the inside surface 32c. The inside surface 30c of the first plate 12 may be positioned to face the inside surface 32c of the second plate 14. The proximal end 30a of the first plate 12 may be pivotally coupled to the proximal end 32a of the second plate 14 by a hinge 34. As such, the first plate 12 may pivot about the hinge 34 relative to the second plate 14.

The bladder 16 may be coupled to the first plate 12, the second plate 14, or both. The bladder 16 may be coupled to and positioned between the inside surface 30c of the first plate 12 and the inside surface 32c of the second plate 14. The bladder 16 may be coupled to the first plate 12 and the second plate 14 by welding, stitching, adhesive, or the like. In embodiments, the bladder 16 is positioned between the first plate 12 and the second plate 14 without being coupled to either of the first plate 12 and the second plate 14. The bladder 16 may house a fluid, such as a dielectric fluid. A "dielectric" fluid as used herein is a medium or material that transmits electrical force without conduction and as such has low electrical conductivity. Some non-limiting example dielectric fluids include perfluoroalkanes, transformer oils, and deionized water. The bladder 16 may comprise any flexible, inextensible, and non-soluble material, such as biaxially oriented polypropylene. The flexible material of the bladder 16 may allow the bladder 16 to elastically deform and change shape when subjected to a compressive force from the first plate 12 and the second plate 14.

The bladder 16 may include a compressible portion 40 and an offset portion 42. The compressible portion 40 of the bladder 16 may be positioned within a space between the first plate 12 and the second plate 14, such that the compressible portion 40 is configured to be compressed between the first plate 12 and the second plate 14 when the hybrid actuation device 10 moves from the non-actuated state to the actuated state. The offset portion 42 of the bladder 16 may be positioned apart from the space between the first plate 12 and the second plate 14 such that the offset portion 42 of the bladder 16 is offset from a perimeter of the first plate 12 and the second plate 14. The perimeter of the first plate 12 may be defined by the distal end 30b of the first plate 12. The perimeter of the second plate 14 may be defined by the distal end 32b of the second plate 14. Accordingly, the offset portion 42 may not be impeded from expanding when the first plate 12 and the second plate 14 are drawn together, as shown in FIG. 1B. When the compressible portion 40 is compressed by the first plate 12 and the second plate 14, the fluid within the compressible portion 40 of the bladder 16 may be displaced into the offset portion 42, thereby expanding the offset portion 42.

In embodiments, the SMA wire 18 may include a first end 50a and an opposite second end 50b. The first end 50a of the SMA wire 18 may be coupled to the side edge 30d of the first plate 12. The second end 50b of the SMA wire 18 may be coupled to the side edge 32d of the second plate 14. The SMA wire 18 may be coupled to the first plate 12 and the second plate 14 by fasteners, welding, stitching, adhesive, or the like. It should be understood that the hybrid actuation device 10 may include any number of SMA wires 18, such as, for example, a pair of SMA wires 18 disposed on opposing sides of the first plate 12 and second plate 14. In embodiments, the hybrid actuation device 10 may include more than two SMA wires 18, such as three, four, etc. As discussed in more detail herein, the SMA wires 18 may extend throughout and between both the first plate 12 and the second plate 14. The SMA wire 18 may be configured to move the first plate 12 and the second plate 14 from a non-actuated position to an actuated position. In the actuated position, a distance between the distal end 30b of the first plate 12 and the distal end 32b of the second plate 14 is less than a distance between the distal end 30b of the first plate 12 and the distal end 32b of the second plate 14 when in the non-actuated position. When the first plate 12 and the second plate 14 are in the actuated position, the hybrid actuation device 10 is in the actuated state. When the first plate 12 and the second plate 14 are in the non-actuated position, the hybrid actuation device 10 is in the non-actuated state.

The SMA wire 18 comprises a SMA material configured to contract in response to a stimulant, such as heat, current, or a magnetic field. In operation, a stimulant, such as the inducement of current flow within the SMA wire 18 may be applied to the SMA wire 18 by a power source, which is electrically coupled to each SMA wire 18. In operation, applying the stimulant to each SMA wire 18 contracts the first end 50a and the second end 50b of each SMA wire 18 toward each other, thereby drawing the first plate 12 and the second plate 14 together. Drawing the first plate 12 and the second plate 14 together moves the hybrid actuation device 10 from the non-actuated state, as shown in FIG. 1A, to the actuated state, as shown in FIG. 1B. Moving the first plate 12 and the second plate 14 from the non-actuated position to the actuated position pivots the first plate 12 about the hinge 34 relative to the second plate 14. The SMA wire 18 may comprise (i) silver-cadmium, (ii) gold-cadmium, (iii) cobalt-nickel-aluminum, (iv) cobalt-nickel-gallium, (v) copper-aluminum-beryllium and at least one of zirconium, boron, chromium, or gadolinium, (vi) copper-aluminum-nickel, (vii) copper-aluminum-nickel-hafnium, (viii) copper-tin, (ix) copper-zinc, (x) copper-zinc and at least one of silicon, aluminum, or tin, (xi) iron-manganese-silicon, (xii) iron-platinum, (xiii) manganese-copper, (xiv) nickel-iron-gallium (xv) nickel-titanium, (xvi) nickel-titanium-hafnium, (xvii) nickel-titanium-palladium, (xviii) nickel-manganese-gallium, (xix) titanium-niobium, or any combination thereof.

The first fixed electrode 22 may include a first electrode portion 60 and a first insulation layer 62 coupled to the first electrode portion 60. The first electrode portion 60 of the first fixed electrode 22 may be coupled to the outer surface 32e of the second plate 14. The first insulation layer 62 may extend over the first electrode portion 60 such that the outer surface 32e of the second plate 14 and the first insulation layer 62 enclose the first electrode portion 60. The first insulation layer 62 may include an outer surface 64 opposite the first electrode portion 60. In embodiments, the first insulation layer 62 may extend over the first electrode portion 60 to entirely enclose the first electrode portion 60.

The second fixed electrode 24 may be positioned at a side of the first fixed electrode 22 opposite the second plate 14, such that the first fixed electrode 22 is positioned between the second plate 14 and the second fixed electrode 24. The second fixed electrode 24 may include a second electrode portion 68 and a second insulation layer 70 coupled to the second electrode portion 68. The second insulation layer 70 may extend entirely over the second electrode portion 68. The second insulation layer 70 may include a first outer surface 76a and an opposite second outer surface 76b. The second insulation layer 70 may extend over the second electrode portion 68 such that the second insulation layer 70 encloses the second electrode portion 68. In embodiments, the second insulation layer 70 may extend only partially over the second electrode portion 68 to partially enclose the second electrode portion 68.

In embodiments, the hybrid actuation device 10 may include any number of fixed electrodes, such as, for example, one, two, three, four, or more than four. In embodiments including a single fixed electrode, the fixed electrode may be coupled to the outer surface 32e of the second plate 14 with the flexible electrode 20 extending along the fixed electrode. The tension spring 26 may be positioned near the proximal end 32a of the second plate 14 to maintain tension on the flexible electrode 20. In embodiments including more than two fixed electrodes, the fixed electrodes may be stacked, with the flexible electrode 20 extending along and wrapping around the plurality of fixed electrodes. The additional fixed electrodes increase the electrostatic attraction force between the fixed electrodes and the flexible electrode 20.

Each of the first insulation layer 62 and the second insulation layer 70 may include a polymer tape to adhere the first insulation layer 62 to the first electrode portion 60 of the first fixed electrode 22, and the second insulation layer 70 to the second electrode portion 68 of the second fixed electrode 24. The insulation layers 62, 70 may additionally be formed from an insulating material such as, for example, polyethylene, cross-linked polyethylene, Kapton®, Teflon®, rubber, silicon, polyvinyl chloride, modified ethylene tetrafluoroethylene, or the like.

Each of the first fixed electrode 22, the second fixed electrode 24, and the flexible electrode 20 may be formed of an aluminum-coated polyester such as, for example, Mylar®. One of the flexible electrode 20 and both the first fixed electrode 22 and the second fixed electrode 24 is a negatively charged electrode, and the other of the flexible electrode 20 and both the first fixed electrode 22 and the second fixed electrode 24 is a positively charged electrode. For purposes discussed herein, either of the flexible electrode 20 or the fixed electrodes 22, 24 may be positively charged so long as the other of the flexible electrode 20 or the fixed electrodes 22, 24 is negatively charged. The flexible electrode 20 may comprise a jagged, zig-zag, or otherwise non-uniform shape to maximize surface area overlap between the flexible electrode 20 and the fixed electrodes 22, 24. In operation, voltage may be applied to the flexible electrode 20 and the fixed electrodes 22, 24, electrostatically attracting the flexible electrode 20 and the fixed electrodes 22, 24 together.

The electrode pinching spring 28 may include a first end 72a and an opposite second end 72b. The first end 72a of the electrode pinching spring 28 may extend from the first fixed electrode 22 and the second end 72b of the electrode pinching spring 28 may extend from the second fixed electrode 24 such that the electrode pinching spring 28 extends between the first fixed electrode 22 and the second fixed electrode 24. The electrode pinching spring 28 may be formed of a biasing member, such as a spring, that biases the first end 72a of the electrode pinching spring 28 toward the second end 72b of the electrode pinching spring 28. The electrode pinching spring 28 may bias the first fixed electrode 22 toward the second fixed electrode 24 to compress the first fixed electrode 22 against the second fixed electrode 24.

The flexible electrode 20 may include a first end 80a and an opposite second end 80b. The second end 80b of the flexible electrode 20 may be coupled to the tension spring 26. The tension spring 26 may extend from the second end 80b of the flexible electrode 20. The hybrid actuation device 10 may further include a platform 84. The platform 84 may be coupled to the distal end 32b of the second plate 14, and extend in a direction opposite the first plate 12 such that an orthographic projection extending from a first surface 86 of the platform 84 intersects the first fixed electrode 22 and the second fixed electrode 24. In other words, the platform 84 extends at least substantially perpendicular to the first plate 12 and the second plate 14. The tension spring 26 may be coupled between the second end 80b of the flexible electrode 20 and the first surface 86 of the platform 84. The tension spring 26 may apply a biasing force biasing the second end 80b of the flexible electrode 20 toward the platform 84.

The flexible electrode 20 may extend between the first fixed electrode 22 and the second fixed electrode 24. The flexible electrode 20 may be compressed between the first fixed electrode 22 and the second fixed electrode 24 by the electrode pinching spring 28. The flexible electrode 20 may contact the outer surface 64 of the first insulation layer 62 of the first fixed electrode 22 and the first outer surface 76a of the second insulation layer 70 of the second fixed electrode 24. The flexible electrode 20 may wrap around an end of the second fixed electrode 24 and extend in contact with the second fixed electrode 24 along the second outer surface 76b of the second insulation layer 70. Contact of the flexible electrode 20 with the second outer surface 76b of the second insulation layer 70 is maintained by the biasing force from the tension spring 26 biasing the second end 80b of the flexible electrode 20 toward the platform 84.

The hybrid actuation device 10 may further include a holding thread 88. The holding thread 88 may be coupled between the flexible electrode 20 and the first plate 12 to couple the flexible electrode 20 to the first plate 12. The holding thread 88 may be formed of a material such as, for example, Kevlar®. The first end 80*a* of the flexible electrode 20 may be coupled to the holding thread 88. The holding thread 88 may extend from the first end 80*a* of the flexible electrode 20 to the first plate 12.

The platform 84 may include a pulley 90 around which the holding thread 88 or the flexible electrode 20 passes, thereby redirecting the holding thread 88 and/or the flexible electrode 20 between the first fixed electrode 22 and the second fixed electrode 24. The pulley 90 may be positioned to guide the holding thread 88 and/or the flexible electrode 20 and alter a direction of the holding thread 88 and/or the flexible electrode 20 to facilitate contact between the first plate 12 and the flexible electrode 20. The holding thread 88 may extend from the first plate 12 over the pulley 90 such that the flexible electrode 20 does not contact the first plate 12, the bladder 16, the second plate 14, or the pulley 90. In embodiments, the hybrid actuation device 10 does not include a holding thread 88, such that the flexible electrode 20 may be directly attached to the first plate 12.

Figure 2A:
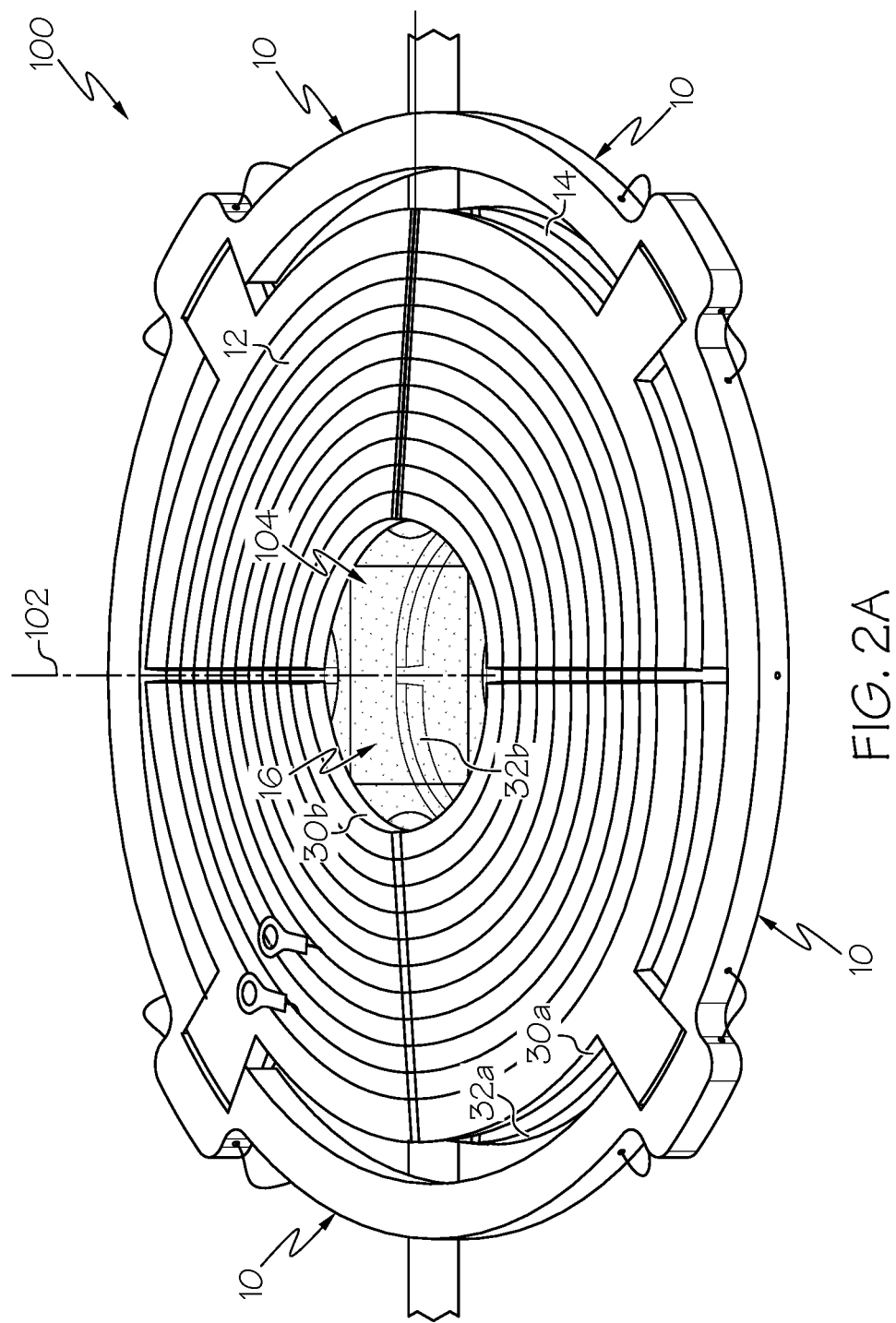
FIG. 2A schematically depicts a perspective view of a hybrid actuation assembly having a plurality of hybrid actuation devices in a non-actuated state, according to one or more embodiments shown and described herein.
Figure 2B:
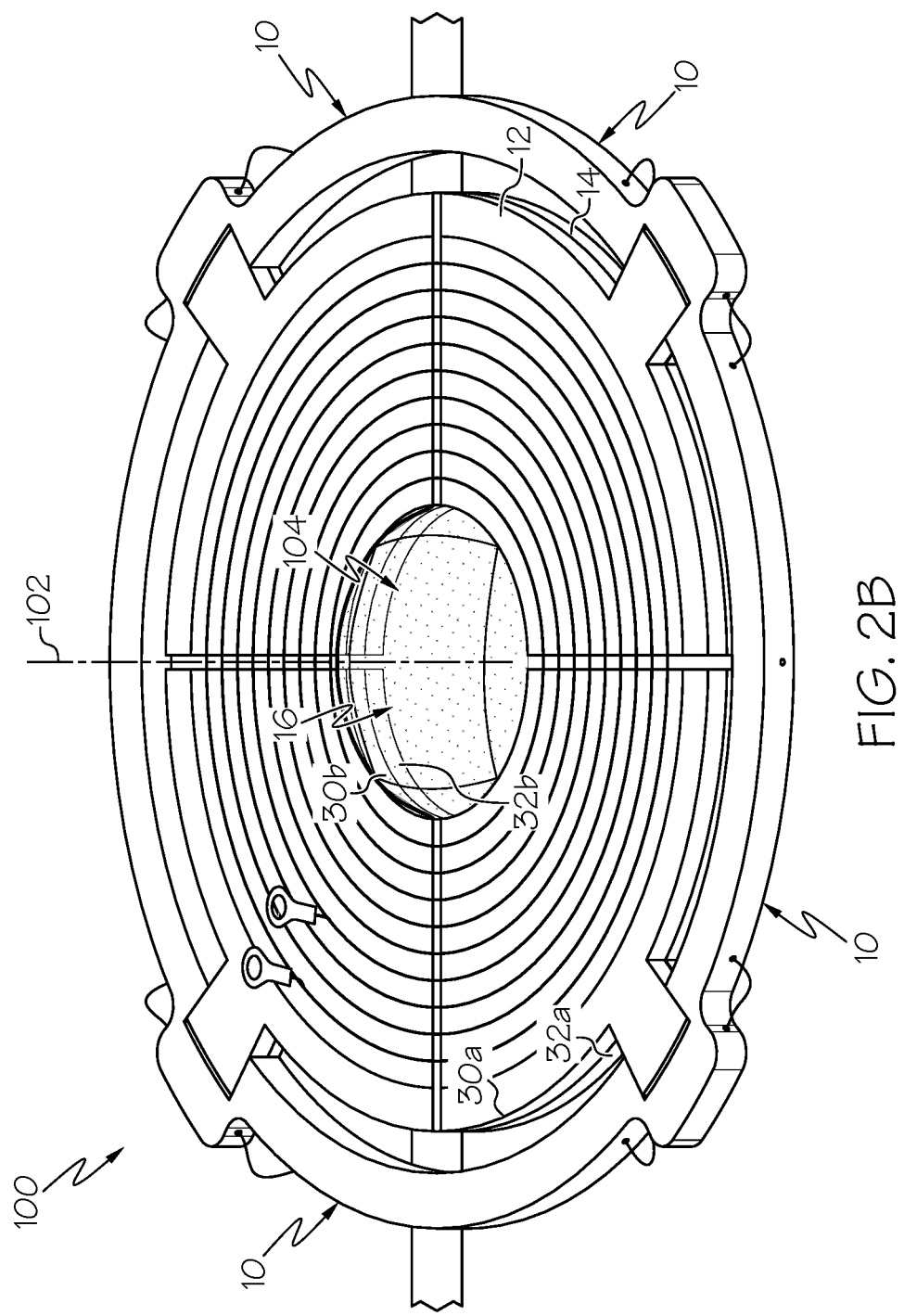
FIG. 2B schematically depicts a perspective view of the hybrid actuation assembly of FIG. 2A in an actuated state, according to one or more embodiments shown and described herein.

Referring to FIGS. 2A and 2B, a perspective view of a hybrid actuation assembly 100 is depicted. The hybrid actuation assembly 100 may include a plurality of hybrid actuation devices 10 arranged about a central axis 102. The hybrid actuation assembly 100 may include any number of hybrid actuation devices 10, such as, for example, one, two, three, four, or more than four. In embodiments including four actuation devices 10, as shown in FIGS. 2A and 2B, the hybrid actuation devices 10 may be shaped as a quadrant of a circle, such that the distal end 30*b* of the first plate 12 and the distal end 32*b* of the second plate 14 come to a point. The proximal end 30*a* of the first plate 12 and the proximal end 32*a* of the second plate 14 may be rounded, and act as a perimeter of the circle defined by the plurality of hybrid actuation devices 10. The hybrid actuation assembly 100 may include a central opening 104 concentric with the central axis 102 and extending through each of the hybrid actuation devices 10. The central opening 104 may expose the bladder 16 to allow the bladder 16 to expand and contract through the opening when the hybrid actuation devices 10 move between the non-actuated state (FIG. 2A) and the actuated state (FIG. 2B). The plurality of hybrid actuation devices 10 may include a singular bladder 16, or in some embodiments, a plurality of bladders 16 in a stacked arrangement, positioned and extending between the first plate 12 and the second plate 14 of each of the hybrid actuation devices 10.

Figure 3:
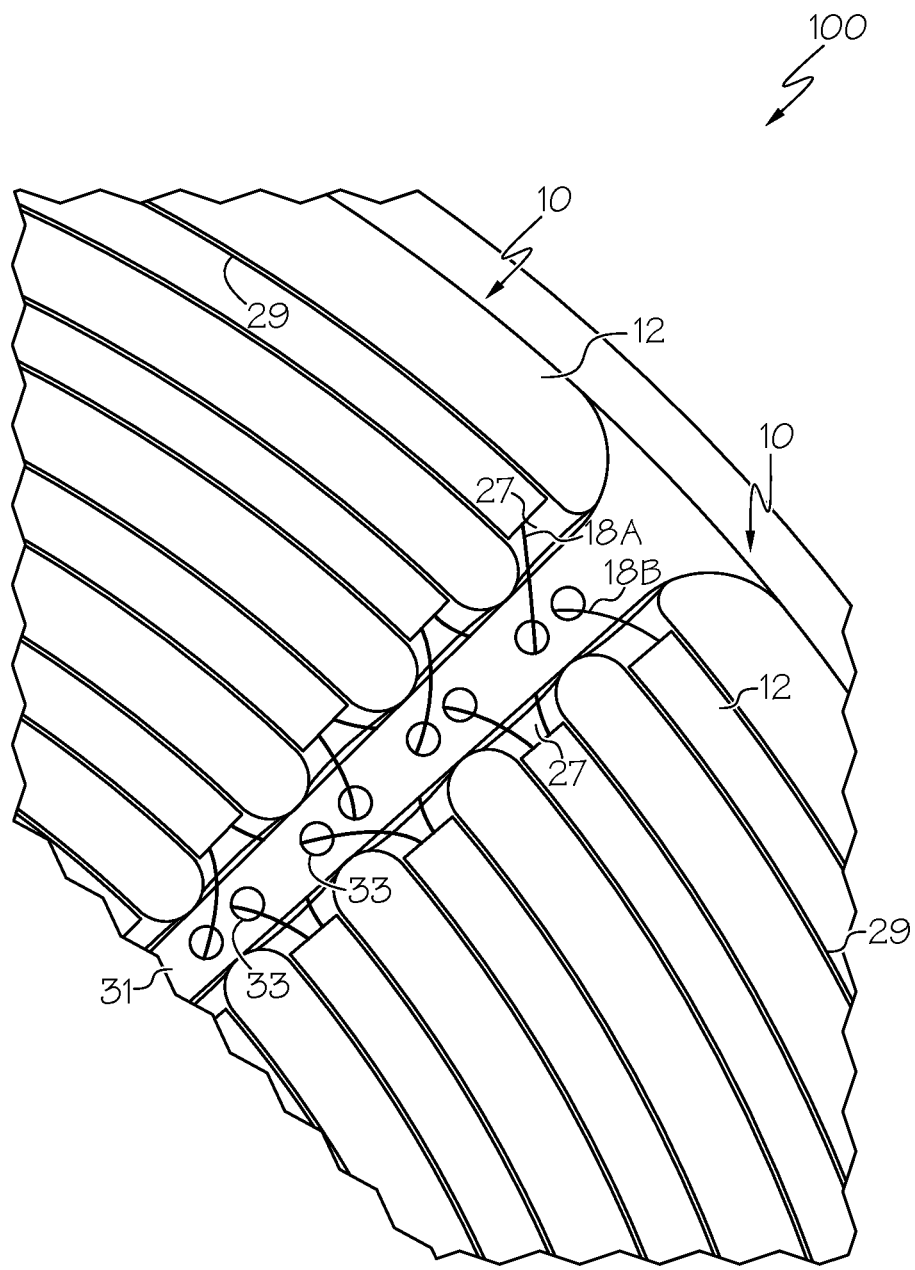
FIG. 3 schematically depicts a spacer disposed between adjacent hybrid actuation devices of the hybrid actuation assembly of FIG. 2A, according to one or more embodiments shown and described herein.

Referring now to FIGS. 2A-3, the hybrid actuation assembly 100 comprises a plurality of SMA wires 18 coupled to the adjacent hybrid actuation devices 10 in a concentric annular pattern. For example, the first plate 12 and the second plate 14 of each of the plate pairs 30 includes a plurality of grooves 27 positioned in a concentric annular pattern and the plurality of SMA wires 18 are positioned in the plurality of grooves 27. In addition, adhesive layers 29 are positioned over the grooves 27 to hold the plurality of SMA wires 18 in the plurality of grooves 27. As shown in FIG. 3, a spacer 31 may be disposed between adjacent hybrid actuation devices 10. The spacer 31 may be acrylic, however other materials are contemplated. The spacer 31 helps to align and organize the plurality of SMA wires 18. For example, the spacer 31 includes a plurality of spacer holes 33. The plurality of SMA wires 18 may be threaded through the plurality of spacer holes 33. In the hybrid actuation assembly 100, the plurality of SMA wires 18 may be coupled to adjacent hybrid actuation devices 10 in an over/under thread pattern. For example, a first SMA wire 18A may be coupled to a first plate 12 of a hybrid actuation device 10 of the plurality of hybrid actuation devices 10 and a second plate 14 (not pictured in FIG. 3) of a second hybrid actuation device 10 of the plurality of hybrid actuation devices 10 and a second SMA wire 18B may be coupled to a second plate 14 (not pictured in FIG. 3) of the first hybrid actuation device 10 of the plurality of hybrid actuation devices 10 and a first plate 12 of the second hybrid actuation device 10 of the plurality of hybrid actuation devices 10.

Figure 4:
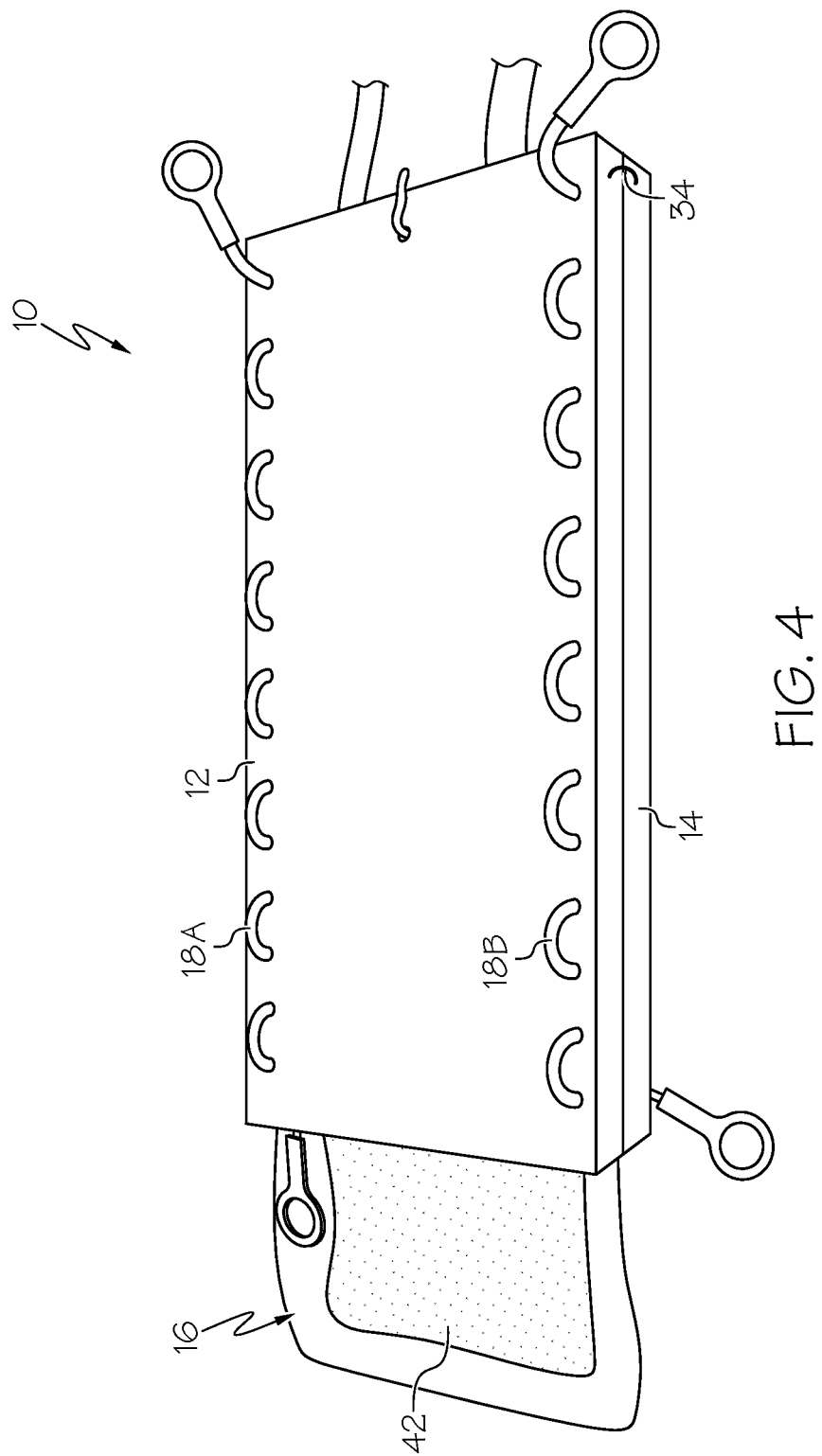
FIG. 4 schematically depicts another hybrid actuation device with a rectilinear shape, according to one or more embodiments shown and described herein.

Referring now to FIG. 4, another embodiment of a hybrid actuation device 10' is depicted. As shown in FIG. 4, the hybrid actuation device 10' comprising the first plate 12 and the second plate 14, which comprise a rectilinear shape. In FIG. 4, the first SMA wire 18A and the second SMA wire 18B are positioned along opposite sides of the first plate 12 and the second plate 14 in a threaded pattern along each respective side. Furthermore, the hinge 34 of the hybrid actuation device 10' may comprise a Kevlar® thread.

Figure 5:
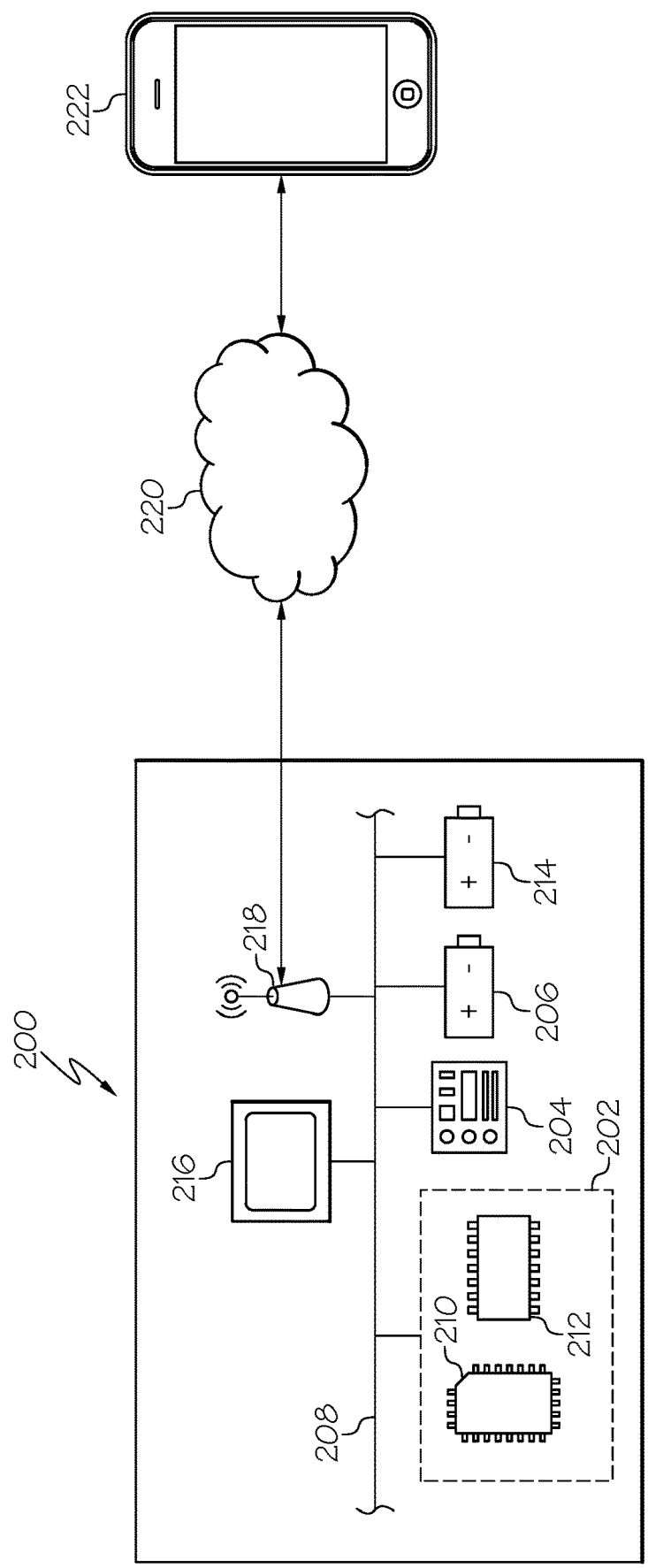
FIG. 5 schematically depicts a control system for controlling operation of the hybrid actuation device of FIG. 1A, according to one or more embodiments shown and described herein.

Referring now to FIG. 5, an actuation system 200 may be provided for operating a hybrid actuation device or a hybrid actuation assembly, such as the hybrid actuation device 10 or the hybrid actuation assembly 100, between the non-actuated state and the actuated state. Thus, the actuation system 200 may include a controller 202, an operating device 204, a first power supply 206, a second power supply 214, and a communication path 208. The various components of the actuation system 200 will now be described.

The controller 202 includes a processor 210 and a non-transitory electronic memory 212 to which various components are communicatively coupled. In some embodiments, the processor 210 and the non-transitory electronic memory 212 and/or the other components are included within a single device. In other embodiments, the processor 210 and the non-transitory electronic memory 212 and/or the other components may be distributed among multiple devices that are communicatively coupled. The controller 202 includes non-transitory electronic memory 212 that stores a set of machine-readable instructions. The processor 210 executes the machine-readable instructions stored in the non-transitory electronic memory 212. The non-transitory electronic memory 212 may comprise RAM, ROM, flash memories, hard drives, or any device capable of storing machine-readable instructions such that the machine-readable instructions can be accessed by the processor 210. Accordingly, the actuation system 200 described herein may be implemented in any conventional computer programming language, as pre-programmed hardware elements, or as a combination of hardware and software components. The non-transitory electronic memory 212 may be implemented as one memory module or a plurality of memory modules.

In some embodiments, the non-transitory electronic memory 212 includes instructions for executing the functions of the actuation system 200. The instructions may include instructions for operating the hybrid actuation devices 10 or the hybrid actuation assembly 100 based on a user command. The processor 210 may be any device capable of executing machine-readable instructions. For example, the processor 210 may be an integrated circuit, a microchip, a computer, or any other computing device. The non-transitory electronic memory 212 and the processor 210 are coupled to the communication path 208 that provides signal interconnectivity between various components and/or modules of the actuation system 200. Accordingly, the communication path 208 may communicatively couple any number of processors with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 5, the communication path 208 communicatively couples the processor 210 and the non-transitory electronic memory 212 of the controller 202 with a plurality of other components of the actuation system 200. For example, the actuation system 200 depicted in FIG. 5 includes the processor 210 and the non-transitory electronic memory 212 communicatively coupled with the operating device 204, the first power supply 206, and the second power supply 214.

The operating device 204 allows for a user to control operation of the hybrid actuation devices 10 or the hybrid actuation assembly 100. In some embodiments, the operating device 204 may be a switch, toggle, button, or any combination of controls to provide user operation. As a non-limiting example, a user may actuate the hybrid actuation devices 10 or the hybrid actuation assembly 100 into the actuated state by activating controls of the operating device 204 to a first position. While in the first position, the hybrid actuation devices 10 or the hybrid actuation assembly 100 will remain in the actuated state. The user may switch the hybrid actuation devices 10 or the hybrid actuation assembly 100 into the non-actuated state by operating the controls of the operating device 204 out of the first position and into a second position.

The operating device 204 is coupled to the communication path 208 such that the communication path 208 communicatively couples the operating device 204 to other modules of the actuation system 200. The operating device 204 may provide a user interface for receiving user instructions as to a specific operating configuration of the hybrid actuation devices 10 or the hybrid actuation assembly 100. In addition, user instructions may include instructions to operate the hybrid actuation devices 10 or the hybrid actuation assembly 100 only at certain conditions.

The first power supply 206 may be electrically connected to the SMA wire 18 to stimulate the SMA wire 18. Stimulating the SMA wire 18 may include providing a current to the SMA wire 18, heating the SMA wire 18, and/or applying a magnetic field to the SMA wire 18. The SMA wire 18 is configured to contract in response to receiving stimulation from the first power supply 206. The contraction of the SMA wire 18 draws the first plate 12 and the second plate 14 together, thereby contracting the compressible portion 40 of the bladder 16 and expanding the offset portion 42 of the bladder 16. As the first plate 12 and the second plate 14 are drawn together, the tension spring 26 contracts to pull the holding thread 88 and the flexible electrode 20, thereby minimizing slack between the fixed electrodes 22, 24 and the flexible electrode 20. The reduction of slack on the flexible electrode 20 helps facilitate strong electrostatic attraction between the fixed electrodes 22, 24 and the flexible electrode 20 when the fixed electrodes 22, 24 and the flexible electrode 20 are actuated.

The second power supply 214 may be electrically connected to the flexible electrode 20, the first fixed electrode 22, and the second fixed electrode 24 to provide a current to each of the flexible electrode 20, the first fixed electrode 22, and the second fixed electrode 24. When a current is applied to the flexible electrode 20, the first fixed electrode 22, and the second fixed electrode 24, the flexible electrode 20 is electrostatically attracted to each of the first fixed electrode 22 and the second fixed electrode 24. The electrostatic attraction between the flexible electrode 20 and the fixed electrodes 22, 24 maintains the hybrid actuation device 10 in the actuated state. In particular, the electrostatic attraction pinches and holds the flexible electrode 20, thereby retaining tension on the holding thread 88 to retain the hybrid actuation device 10 in the actuated state. Thus, the fixed electrodes 22, 24 and the flexible electrode 20 operate as an electrostatic clutch. Once the fixed electrodes 22, 24 and the flexible electrode 20 are drawn together by application of a current, the stimulant may be removed from the SMA wire 18, expanding the SMA wire 18. However, the continued application of current to the fixed electrodes 22, 24 and the flexible electrode 20 together retains the hybrid actuation device 10 in the actuated state. Thus, the electrostatic attraction of the electrodes 20, 22, 24 keeps the hybrid actuation device 10 actuated without the negative thermal buildup of prolonged actuation of the SMA wire 18.

In operation, when the hybrid actuation device 10 is actuated by contracting the SMA wire 18, expansion of the offset portion 42 of the bladder 16 may produce a force of 25 Newton-millimeters (N·mm) per cubic centimeter ($cm^3$) of actuator volume or greater, such as 30 N·mm per $cm^3$ or greater, 35 N·mm per $cm^3$ or greater, 40 N·mm per $cm^3$ or greater, 45 N·mm per $cm^3$ or greater, 50 N·mm per $cm^3$ or greater, 55 N·mm per $cm^3$ or greater, 60 N·mm per $cm^3$ or greater, 70 N·mm per $cm^3$ or greater, 80 N·mm per $cm^3$ or greater, 90 N·mm per $cm^3$ or greater, 100 N·mm per $cm^3$ or greater, 125 N·mm per $cm^3$ or greater, or any value within a range having any two of these values as endpoints. Moreover, as one example to illustrate the strength of the electrostatic attraction between the flexible electrode 20 and the fixed electrodes 22, 24, when actuated with a voltage of 70 volts, the flexible electrode 20 and the fixed electrodes 22, 24 are pinched together with a strength sufficient to resist 8 N of shear force applied to the interface between the flexible electrode 20 and the fixed electrodes 22, 24.

Each of the first power supply 206 and the second power supply 214 may be a rechargeable direct current power source. It is to be understood that the power supplies 206, 214 may be a single power supply or battery for providing power to the hybrid actuation devices 10 or the hybrid actuation assembly 100. A power adapter (not shown) may be provided and electrically coupled via a wiring harness or the like for providing power to the hybrid actuation devices 10 or the hybrid actuation assembly 100 via the power supplies 206, 214.

In some embodiments, the actuation system 200 also includes a display device 216. The display device 216 is coupled to the communication path 208 such that the communication path 208 communicatively couples the display device 216 to other modules of the actuation system 200. The display device 216 may output a notification in response to an actuation state of the hybrid actuation devices 10 or the hybrid actuation assembly 100 or indication of a change in the actuation state of the hybrid actuation devices 10 or the hybrid actuation assembly 100. Moreover, the display device 216 may be a touchscreen that, in addition to providing optical information, detects the presence and location of a tactile input upon a surface of or adjacent to the display device 216. Accordingly, the display device 216 may include the operating device 204 and receive mechanical input directly upon the optical output provided by the display device 216.

In some embodiments, the actuation system 200 includes network interface hardware 218 for communicatively coupling the actuation system 200 to a portable device 222 via a network 220. The portable device 222 may include, without limitation, a smartphone, a tablet, a personal media player, or any other electric device that includes wireless communication functionality. It is to be appreciated that, when provided, the portable device 222 may serve to provide user commands to the controller 202, instead of the operating device 204. As such, a user may be able to control or set a program for controlling the hybrid actuation devices 10 or the hybrid actuation assembly 100 without utilizing the controls of the operating device 204. Thus, the hybrid actuation devices 10 or the hybrid actuation assembly 100 may be controlled remotely via the portable device 222 wirelessly communicating with the controller 202 via the network 220.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hybrid actuation device comprising:
a first plate and a second plate coupled to the first plate;
a shape memory alloy wire coupled to the first plate and the second plate;
a bladder positioned between the first plate and the second plate, the bladder housing a fluid;
a first fixed electrode coupled to the second plate; and
a flexible electrode coupled to the first plate and extending along the first fixed electrode.

2. The hybrid actuation device of claim 1, wherein the shape memory alloy wire is configured to move the first plate and the second plate from a non-actuated position to an actuated position, and wherein, when in the actuated position, a distance between a distal end of the first plate and a distal end of the second plate is less than a distance between the distal end of the first plate and the distal end of the second plate when in the non-actuated position.

3. The hybrid actuation device of claim 2, wherein an offset portion of the bladder is offset from a perimeter of the first plate and a perimeter of the second plate.

4. The hybrid actuation device of claim 1, further comprising a second fixed electrode positioned at a side of the first fixed electrode opposite the second plate, the flexible electrode extending between the first fixed electrode and the second fixed electrode.

5. The hybrid actuation device of claim 4, further comprising an electrode pinching spring extending between the first fixed electrode and the second fixed electrode, the electrode pinching spring configured to bias the first fixed electrode and the second fixed electrode toward one another.

6. The hybrid actuation device of claim 4, wherein:
the first fixed electrode comprises a first insulation layer,
the second fixed electrode comprises a second insulation layer, and
the flexible electrode is disposed between the first insulation layer and the second insulation layer.

7. The hybrid actuation device of claim 1, wherein the flexible electrode includes a first end and an opposite second end, the first end coupled to the first plate, the second end coupled to a tension spring.

8. The hybrid actuation device of claim 7, further comprising a holding thread extending between the first end of the flexible electrode and the first plate.

9. The hybrid actuation device of claim 1, further comprising a hinge provided at a proximal end of the first plate and a proximal end of the second plate, the hinge configured to pivotally couple the first plate to the second plate.

10. A hybrid actuation device comprising:
a first plate and a second plate pivotally coupled to the first plate;
a bladder comprising a compressible portion and an offset portion, the bladder housing a fluid positioned between the first plate and the second plate, the offset portion of the bladder positioned apart from the first plate and the second plate; and
a shape memory alloy wire coupled to the first plate and the second plate, wherein
the shape memory alloy wire is configured to move the first plate and the second plate between a non-actuated position and an actuated position when a current is applied to the shape memory alloy wire, and
when moving from the non-actuated position to the actuated position, the first plate and the second plate are pivoted toward each other to compress the compressible portion of the bladder positioned between the first plate and the second plate, and to expand the offset portion of the bladder positioned apart from the first plate and the second plate.

11. The hybrid actuation device of claim 10, further comprising:
a first fixed electrode coupled to the second plate; and
a flexible electrode coupled to the first plate and extending along the first fixed electrode.

12. The hybrid actuation device of claim 11, further comprising a second fixed electrode positioned at a side of the first fixed electrode opposite the second plate, the flexible electrode extending between the first fixed electrode and the second fixed electrode.

13. The hybrid actuation device of claim 12, further comprising an electrode pinching spring extending between the first fixed electrode and the second fixed electrode, the electrode pinching spring configured to move the first fixed electrode and second fixed electrode toward one another.

14. The hybrid actuation device of claim 11, wherein the flexible electrode includes a first end and an opposite second end, the first end being coupled to the first plate, the second end being coupled to a tension spring.

15. The hybrid actuation device of claim 14, further comprising a holding thread coupled between the first end of the flexible electrode and the first plate.

16. The hybrid actuation device of claim 11, wherein:
the first fixed electrode comprises a first insulation layer,
the second fixed electrode comprises a second insulation layer, and the flexible electrode is disposed between the first insulation layer and the second insulation layer.

17. The hybrid actuation device of claim 10, further comprising a hinge provided at a proximal end of the first plate and a proximal end of the second plate, the hinge configured to pivotally couple the first plate to the second plate.

18. A method of operating a hybrid actuation device, the method comprising:
  actuating the hybrid actuation device, the hybrid actuation device comprising:
    a first plate and a second plate coupled to the first plate;
    a shape memory alloy wire coupled to the first plate and the second plate, the shape memory alloy wire configured to move the first plate and the second plate from a non-actuated position to an actuated position, when in the actuated position, a distance between a distal end of the first plate and a distal end of the second plate being less than a distance between the distal end of the first plate and the distal end of the second plate when in the non-actuated position;
    a bladder positioned between the first plate and the second plate, the bladder housing a fluid;
    a first fixed electrode coupled to the second plate; and
    a flexible electrode coupled to the first plate and extending along the first fixed electrode, and
  applying a current to the flexible electrode and the first fixed electrode thereby electrostatically attracting the flexible electrode and the first fixed electrode together to hold the first plate and the second plate in the actuated position.

19. The method of claim 18, wherein:
actuating the shape memory alloy wire comprises one or more of:
  directing a current through the shape memory alloy wire;
  heating the shape memory alloy wire; and
  applying a magnetic field to the shape memory alloy wire.

20. The method of claim 18, further comprising:
removing the stimulant applied to the shape memory alloy wire while maintaining the current applied to the flexible electrode and the first fixed electrode.

* * * * *